US006959168B2

(12) United States Patent
Parkman

(10) Patent No.: US 6,959,168 B2
(45) Date of Patent: Oct. 25, 2005

(54) GROUND CONTROL OF FORWARD LINK ASSIGNMENTS

(75) Inventor: David S. Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 721 days.

(21) Appl. No.: 09/847,450

(22) Filed: May 2, 2001

(65) Prior Publication Data

US 2002/0164948 A1 Nov. 7, 2002

(51) Int. Cl.[7] .............................................. H04B 7/185
(52) U.S. Cl. ..................................... 455/12.1; 455/427
(58) Field of Search .............................. 455/12.1, 427, 455/430, 431, 429, 13.1, 13.4

(56) References Cited

U.S. PATENT DOCUMENTS

| | | | |
|---|---|---|---|
| 5,649,318 A | 7/1997 | Lusignan | |
| 6,201,797 B1 | 3/2001 | Leuca et al. | |
| 6,208,307 B1 | 3/2001 | Frisco et al. | |
| 6,269,245 B1 | 7/2001 | Li et al. | |
| 6,453,267 B1 * | 9/2002 | Rudzik et al. | 702/185 |
| 2002/0168971 A1 * | 11/2002 | Parkman | 455/427 |
| 2003/0026356 A1 * | 2/2003 | Brommer | 375/324 |
| 2003/0050008 A1 * | 3/2003 | Patterson et al. | 455/12.1 |

* cited by examiner

*Primary Examiner*—Nick Corsaro
*Assistant Examiner*—Edan Orgad
(74) *Attorney, Agent, or Firm*—Harness Dickey & Pierce P.L.C.

(57) ABSTRACT

A communications system and method for assigning forward link transponder assignments to mobile platforms is provided. The communications system comprises at least one ground station in communication with a plurality of satellites and mobile platforms, wherein the mobile platforms receive assignments to various transponders on the satellites through the ground station based on the desired set of data or services. The communications system requires a return link from the mobile platform to the ground station so that changes in the desired data or services can be confirmed, and accordingly, a default transponder assignment table is incorporated in each mobile platform to establish the return link in the event of receiver equipment failure. The communications system further comprises a set of forward link transponder assignments loaded onto a piece of communications equipment to provide the assignments to a piece of receiver equipment in the event of receiver equipment failure.

16 Claims, 1 Drawing Sheet

GROUND CONTROL OF FORWARD LINK ASSIGNMENTS

FIELD OF THE INVENTION

The present invention relates generally to bi-directional satellite communication systems and more particularly to methods of transmitting forward link transponder assignments to mobile platforms.

BACKGROUND OF THE INVENTION

In bi-directional communications systems of the related art, a ground station transmits and receives signals to and from a satellite, and the satellite, in turn, transmits and receives signals to and from a mobile platform. Typically, a plurality of satellites are present that cover particular geographic regions, and each satellite further includes a plurality of transponders that receive data from the ground station and subsequently transmit data to the mobile platform. In addition, the mobile platform includes receive and transmit antennas, which are used to communicate with the satellite transponders.

In order for the mobile platform to know which satellite transponders to communicate with, a series of forward link transponder assignments are either stored in receiver equipment on-board the mobile platform or transmitted to the mobile platform from the ground station. Generally, different transponders are used to transmit different types of services, i.e. video, audio, Internet, and others, and thus different forward link transponder assignments may be required for a mobile platform to receive the required data. Once the transponder assignments are known, the mobile platform then tunes its receivers to the correct transponder(s) according to the assignments, wherein a plurality of transponders may be tuned if a variety of data types are required by the mobile platform.

If the receiver equipment of the mobile platform fails, however, the mobile platform will lose its forward link transponder assignments and will not know which transponders to which its receivers must be tuned. As a result, the mobile platform loses its link with the specific satellite transponders, and further communications are disabled until the receiver equipment can be repaired or replaced.

Although a failure of the receiver equipment to link to a transponder results in a loss of data transmission, not all data transmissions are necessarily interrupted. Only the specific data or service type transmitted by the unlinked transponder is unavailable while other data types remain linked and available if the forward link assignments remain operational. However, while this data loss may only be partial, the overall effect on the mobile platform may be significant if one data or service type is dependent upon another, e.g. video and audio.

When a failure occurs in known art communications systems, the receiver equipment of the mobile platform is typically removed and replaced by maintenance personnel. Because the receiver equipment does not know the forward link transponder assignments for the specific mobile platform onto which it is installed, maintenance personnel may manually load the assignments during repair procedures. The manual loading of forward link transponder assignments requires additional manual operations and therefore increases aircraft downtime and maintenance costs. Moreover, the aircraft is generally on the ground during receiver equipment maintenance, and as a result, data communications from satellite transponders to the mobile platform are interrupted for the duration of the flight after which transponder links were lost.

Accordingly, there remains a need in the art for a communications system that can provide forward link transponder assignments to a mobile platform without the manual operations associated with receiver equipment maintenance, and which can provide the assignments during continued operation of the mobile platform.

SUMMARY OF THE INVENTION

In one preferred form, the present invention provides a communications system and method that transmits forward link transponder assignments from a ground station to a mobile platform, such as an aircraft, through the novel use of a default transponder assignment table. The default transponder assignment table is loaded onto receiver equipment of the mobile platform and contains assignments to a plurality of transponders on a plurality of satellites around the world. If the mobile platform receiver equipment fails and the current forward link transponder assignments are lost, the receiver equipment reverts to the default transponder assignment table to receive a temporary transponder assignment. Although the temporary transponder assignment is incorrect for the specific mobile platform, the transponder that is subsequently linked sends a required return link to the receiver equipment so that the receiver equipment can in turn contact the ground station for the correct forward link transponder assignments.

As set forth, the communications system of the present invention requires that the mobile platform have a return link to a ground station before the correct forward link transponder assignments can be transmitted. The return link is required so that the ground station can confirm any changes in data types required by the mobile platform. Additionally, the ground station comprises a prioritized list of all transponders on all satellites for all regions around the world. The prioritized list is then utilized by the mobile platform to tune its receivers to the highest priority transponders for subsequent data communications.

In another preferred form, the present invention provides a communications system and method that provides forward link transponder assignments from a piece of communications equipment to a piece of receiver equipment on the mobile platform in the event of receiver equipment failure. Initially, the correct forward link transponder assignments for the mobile platform are mirrored onto the piece of communications equipment on the same mobile platform. When a piece of receiver equipment fails and its forward link transponder assignments are lost, the correct forward link assignments from the piece of communications equipment is transferred to a piece of receiver equipment of the mobile platform.

If both the receiver equipment and the communications equipment of the mobile platform are simultaneously being replaced, the mobile platform then reverts to the default transponder assignment table for a transponder link. A default assignment is used to receive a return link from a satellite transponder such that the mobile platform can receive the correct forward link transponder assignment from the ground station in accordance with the first preferred form of the present invention.

The loading of forward link transponder assignments onto receiver equipment can either be conducted during continued operation of the mobile platform or on the ground during maintenance downtime. During operation, the receivers are loaded either through the default transponder assignment table method or the mirrored assignment method from the piece of communications equipment. Similarly, on the ground, the replacement equipment is installed and the mobile platform acquires the forward link transponder assignments either through the default transponder assignment table or from the communications equipment having mirrored forward link transponder assignments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
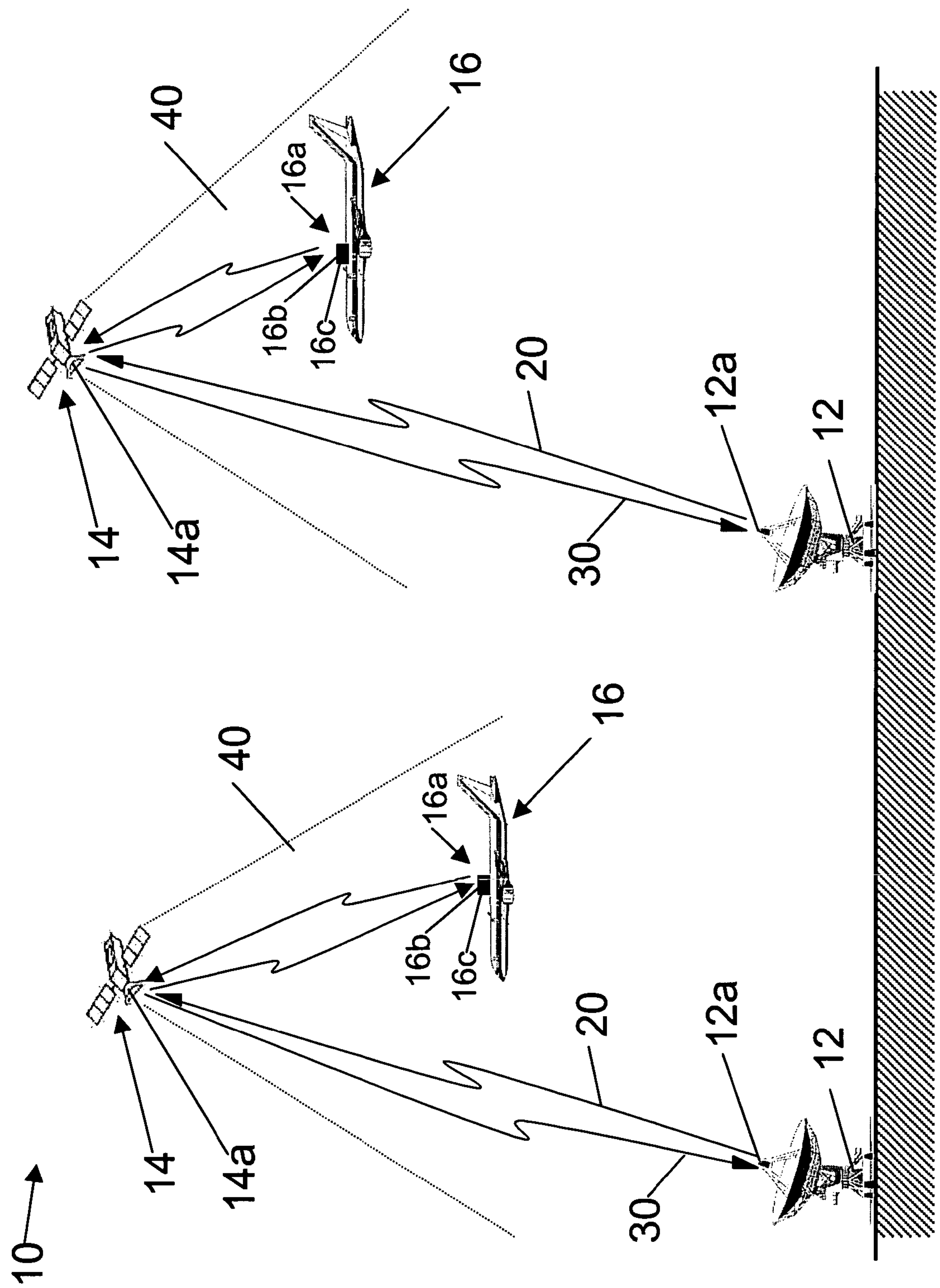
FIG. 1 is a simplified block diagram illustrating bi-directional communication amongst the ground stations, the mobile platforms, and the satellites of the present invention.

The following description of the preferred embodiments is merely exemplary in nature and is in no way intended to limit the invention, its application, or uses.

Referring to FIG. 1, the preferred embodiment of the communications system of the present invention is illustrated and generally indicated by reference numeral 10. The communications system 10 comprises a ground station 12 in communication with a satellite 14, which in turn is in communication with a mobile platform 16. As shown, there may exist a plurality of ground stations 12, satellites 14, and mobile platforms 16 around the world for continuous data communications regardless of geographic location.

Although the present invention is directed to a communications system wherein the mobile platform is an aircraft, the invention is also applicable to other mobile platforms such as ships, trains, buses, and others. Accordingly, the reference to aircraft throughout the description of the invention herein should not be construed as limiting the applicability of the invention to only aircraft.

Generally, data or services such as command and control, telemetry, unicast (Internet), multicast (video, audio), and others are transmitted from an antenna 12*a* of the ground station 12 to transponders 14*a* of the satellite 14. The satellite transponders 14*a,* in turn, transmit the data to a mobile terminal 16*a* positioned in strategic locations on the mobile platform 16. Mobile terminal 16*a* comprises a plurality of receivers 16*b* and transmitters 16*c* with suitable control electronics to transmit and receive signals to and from satellite transponders 14*a*. Since each transponder 14*a* may be used to transmit different types of services, i.e. one for video and another for audio, the receivers 16*b* must be tuned to a specific transponder 14*a* or set of transponders to receive the required data or service.

The mobile platform 16 receives instructions on which specific transponder to tune from the ground station 12 in the form of forward link transponder assignments. Generally, the mobile platform 16 communicates to the ground station 12, through satellite transponders 14*a,* the type of data required, e.g. unicast data. Transmitters 16*c* transmit a signal to satellite transponders 14*a,* which in turn transmit the signal to the ground station 12. The ground station 12 then sends a forward link transponder assignment for the unicast transponder to the satellite transponders 14*a,* which in turn transmit the signal to the receivers 16*b*.

The ground station 12 comprises a master transponder assignment list that contains a prioritized listing of all transponders on all satellites for all regions around the world. From this master transponder assignment list, the correct forward link transponder assignments for a given mobile platform 16 are transmitted from the ground station 12 to the mobile platform 16 through a forward link 20 to the satellite 14. The satellite transponders 14*a* then transmit the forward link transponder assignments to the mobile platform 16. The correct list of assignments is then utilized by the mobile platform 16 to tune its receivers 16*b* to the correct transponders 14*a* for the required data communications during flight.

The communications system of the present invention further requires that the mobile platform 16 receive a return link assignment from a transponder 14*a* before a forward link transponder assignment can be transmitted. The return link is required so that any changes requested by the mobile platform 16 can be confirmed through a return link 30 before the ground station 12 sends another forward link transponder assignment. Even if the mobile platform 16 is linked to only a single transponder 14*a,* a return link assignment can still be received. As a result, a return link can be opened when at least one transponder 14*a* is in communication with the mobile platform 16.

Additionally, the satellites 14 may comprise several sets of transponders where each set of transponders is used for a particular set of data or services. For example, a single set of transponders may be used for command and control data while another set of transponders on the same satellite may be used for multicast (video, audio) data. Each set of transponders is then assigned a priority by the ground station 12 depending on the data or services critical to the mobile platform 16. For instance, command and control data would be a higher priority for the mobile platform 16 than multicast data, and thus the set of transponders transmitting command and control data would have a higher priority than those transmitting multicast data. Accordingly, all of the transponder sets are assigned a priority from highest to lowest, and any number of transponder sets may exist on any one satellite 14. Similarly, the plurality of satellites 14 are also given a priority from highest to lowest, again, depending on the data or services critical to the mobile platform 16.

In operation, the mobile platform 16 powers up and receives its location from an on-board navigation system. After acquiring its location, the mobile platform 16 locates a satellite 14 within its footprint 40 and subsequently directs its receivers 16*b* to that particular satellite 14. One the receivers 16*b* are locked onto at least one transponder 14*a,* a return link is transmitted from the transponder 14*a* to the receiver 16*b* such that mobile platform 16 can communicate with the ground station 12 for the correct forward link transponder assignments. Once the forward link transponder assignments are received by the mobile platform 16, the receivers 16*b* are accordingly tuned to the highest priority transponders 14*a*.

If a single receiver 16*b* fails during flight, one of the remaining receivers may be re-tuned to include the transponder to which the failed receiver 16*b* was tuned. If the receiver is able to lock onto the transponder, the receiver are assigned to the next lower priority set of transponders 14*a*. If the receiver is still unable to lock onto a transponder in the set having the required type of data or service, the next lower priority set of transponders are assigned. The remaining receivers continue progressing through each lower set of transponders until the transponder signal is locked on. If the remaining receivers cannot obtain a signal from any of the transponders on a single satellite, then the next lower priority satellite and its set of transponders are queried for the required transponder signal. Through this full search method, the mobile platform 16 can further maintain a level of communication even in the event of an entire satellite failure.

If new receiver equipment is installed or is present on-board the aircraft to overcome any receiver equipment failure, the new equipment is typically not loaded with the forward link transponder assignments for the specific mobile platform onto which it is installed. In order to avoid the operations associated with manual loading of the assignments, the communications system of the present invention loads forward link transponder assignments onto receiver equipment directly from the ground station 12 through the forward link 20. The new equipment is first loaded with a default transponder assignment table, which contains assignments to transponders that are not necessarily the required transponders for the particular mobile platform 16. The mobile platform 16 recognizes that the default transponder assignment table is incorrect, however, the default assignments are used to acquire the required return link assignment from the transponders 14*a* to open a return link to the ground station 12 where the master forward link transponder assignments are stored.

As set forth, the communications system of the present invention requires a return link to the ground station in order to confirm changes, and therefore, no forward link transponder assignments can be transferred until a return link is established. Once a return link is established, the mobile platform 16 is able to receive the correct forward link transponder assignments from the ground station 12 for the required set of data or services. In this manner, the forward link transponder assignments are acquired during operation of the mobile platform rather than during maintenance downtime. As a result, the data or services provided during flight are more readily available and overall maintenance costs are reduced.

In another preferred form, the communications system of the present invention transfers forward link transponder assignments from a piece of communications equipment to a piece of receiver equipment on the same mobile platform in the event of receiver equipment failure. Initially, the correct forward link transponder assignments for mobile platform 16 are mirrored onto a piece of communications equipment located on the mobile platform. When new receiver equipment of mobile platform 16 is installed or present, the piece of communications equipment transmits the forward link transponder assignments to the new receiver equipment. As a result, the mobile platform 16 acquires the correct forward link transponder assignments without necessarily communicating through the ground station 12.

If both the receiver equipment and the communications equipment of the mobile platform are simultaneously down or are being replaced, the mobile platform 16 acquires its forward link transponder assignments using the default transponder assignment table method as previously described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for transmitting forward link transponder assignments to a mobile platform comprising:

at least one receiver on the mobile platform;

at least one transmitter on the mobile platform;

at least one transponder in communication with the receiver, the transponder comprising return link assignments;

at least one base station in communication with the receiver, the base station comprising a master forward link transponder assignment list; and a default transponder assignment table loaded on the receiver, the default transponder assignment table comprising a default forward link transponder assignment table, wherein when the transmitter transmits a signal to the transponder based on the default transponder assignment table, the transponder transmits the return link assignment to the receiver, and the transmitter transmits a signal to the base station via the transponder such that the base station transmits a correct forward link assignment via the transponder to the receiver.

2. The system of claim 1, wherein the transponder is on a satellite.

3. The system of claim 2, wherein the master forward link transponder assignment list comprises a plurality of transponders on a plurality of satellites for a plurality regions around the world.

4. The system of claim 3, wherein the base station communicates with the receiver through a forward link from the base station to the satellite, such that the transponder transmits the correct forward link transponder assignment to the mobile platform.

5. The system of claim 3, wherein the plurality of transponders are prioritized by the base station such that the receiver can be tuned to another transponder in the event of a transponder failure.

6. The system of claim 3, wherein the plurality of satellites are prioritized by the base station such that the receiver can be tuned to transponder on another satellite in the event of a satellite failure.

7. A system for transmitting forward link transponder assignments from at least one transponder to a plurality of mobile platforms comprising:

a receiver component on the mobile platform;

at least one ground station in communication with the mobile platform via the transponder, the base station comprising a master forward link transponder assignment list; and a communications component on the mobile platform, the communications component including:

a default transponder assignment table loaded on the communications component, the default transponder table comprising a default forward link transponder assignment table, wherein when the communications component transmits the forward link transponder assignments to the receiver component when the receiver component loses at least one forward link assignment.

8. The system of claim 7, further comprising:

wherein when the receiver component is inoperable, the communications component transmits a signal to the transponder based on the default transponder assignment table, the transponder transmits a return link assignment to the communications component, and the mobile platform transmits a signal to the base station via the transponder such that the ground station transmits a correct forward link assignment via the transponder to the communications component.

9. The system of claim 8, wherein the transponder is on a satellite.

10. The system of claim 9, wherein the master forward link transponder assignment list comprises a plurality of transponders on a plurality of satellites for a plurality of regions around the world.

11. The system of claim 10, wherein the base station communicates with the receiver through a forward link from the base station to the satellite, such that the transponder transmits the correct forward link transponder assignment to the mobile platform.

12. The system of claim 10, wherein the plurality of transponders are prioritized by the base station such that the receiver can be tuned to another transponder in the event of a transponder failure.

13. The system of claim 10, wherein the plurality of satellites are prioritized by the base station such that the receiver can be tuned to transponder on another satellite in the event of a satellite failure.

14. A method of transmitting forward link transponder assignments to a mobile platform comprising the steps of:

(a) loading a default forward link transponder assignment table onto a receiver of a mobile terminal of the mobile platform;

(b) transmitting a signal from a transmitter of the mobile terminal to at least one transponder listed in the default forward link transponder assignment table;

(c) transmitting a return link assignment from the at least one transponder to the receiver of the mobile terminal;

(d) transmitting a signal from the transmitter to a base via the transponder requesting correct forward link transponder assignments;

(e) transmitting the correct forward link transponder assignments from the base station via the transponder to the receiver; and (f) retuning the receiver to the correct transponders based on the correct forward link transponder assignments.

15. The method of claim 14, wherein the step of transmitting the correct forward link transponder assignment is accomplished through a forward link from the base station to the satellite, such that the transponder transmits the correct forward link transponder assignment to the mobile platform.

16. A method of tuning receivers to a transponder tuned by a failed receiver comprising the steps of:

(a) loading a plurality of priority sets of forward link transponder assignments on a base station;

(b) loading a plurality of priority satellites on a base station;

(c) re-tuning the receivers to a first priority set of transponders until the transponder is tuned;

(d) re-tuning the receivers to a second priority set of transponders until the transponder is tuned if step (c) fails to tune the transponder;

(e) repeating step (d) for additional priority sets of transponders until the transponder is tuned;

(f) re-tuning the receivers to a first priority satellite if step (e) fails to tune the transponder;

(g) re-tuning the receivers to a second priority satellite if step (e) fails to tune the transponder; and (h) repeating step (g) for additional priority sets of transponders until the transponder is tuned.

* * * * *